(12) United States Patent
Fyie et al.

(10) Patent No.: US 8,480,831 B2
(45) Date of Patent: Jul. 9, 2013

(54) SYSTEM AND METHOD FOR MANUFACTURING COMPOSITE WOOD PRODUCTS

(75) Inventors: Joseph A. Fyie, Boise, ID (US); Kristin L. Brandt, Boise, ID (US); Brian C. Scott, Boise, ID (US)

(73) Assignee: Weyerhaeuser NR Company, Federal Way, WA (US)

( * ) Notice: Subject to any disclaimer, the term of this patent is extended or adjusted under 35 U.S.C. 154(b) by 534 days.

(21) Appl. No.: 12/721,721

(22) Filed: Mar. 11, 2010

(65) Prior Publication Data

US 2011/0220271 A1 Sep. 15, 2011

(51) Int. Cl.
*B32B 37/02* (2006.01)
(52) U.S. Cl.
USPC .......................... 156/182; 156/312; 144/348
(58) Field of Classification Search
USPC .................. 156/182, 312; 144/348, 351, 352
See application file for complete search history.

(56) References Cited

U.S. PATENT DOCUMENTS 6,878,230 B2 * 4/2005 Abe et al. ...................... 156/182
2008/0149262 A1 * 6/2008 Hattori .......................... 156/60

OTHER PUBLICATIONS

McAlister, Robert H., The Research and Development of COM-PLY Lumber, General Technical Report SE-53, Southeastern Forest Experiment Station, United States Department of Agriculture Forest Service, Mar. 1989, Asheville, North Carolina, United States.

* cited by examiner

*Primary Examiner* — Katarzyna Wyrozebski Lee
*Assistant Examiner* — John Blades
(74) *Attorney, Agent, or Firm* — Christensen O'Connor; Johnson Kindness PLLC

(57) ABSTRACT

The present disclosure is directed generally towards systems and methods for manufacturing composite wood products. In some embodiments, the method includes performing an initial manufacturing step and performing a subsequent manufacturing step before residual heat from the initial manufacturing step completely dissipates. The initial manufacturing step includes combining veneers with an adhesive and heating and consolidating the veneers to form a core laminate. The one or more subsequent manufacturing steps each include applying one or more layers to the core laminate. The one or more layers each include a veneer component and an adhesive component. The core laminate and the one or more layers are sequentially heated and pressed to form a composite wood product. The disclosure also relates to systems for manufacturing composite wood products.

20 Claims, 9 Drawing Sheets

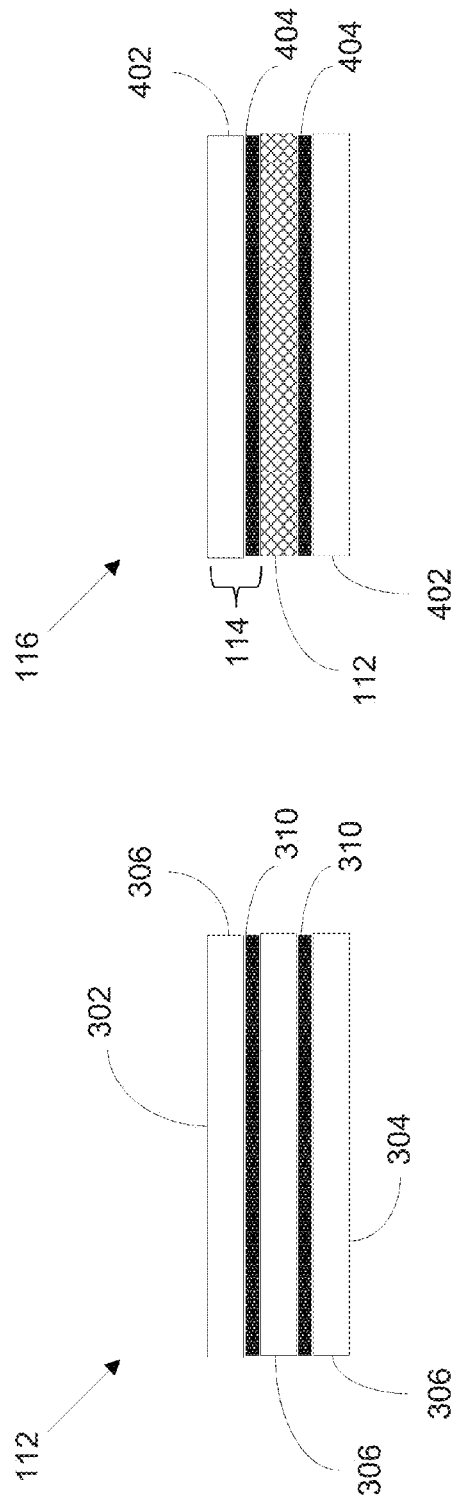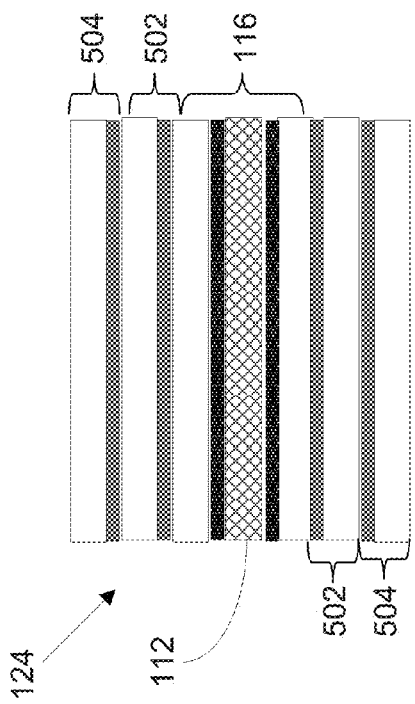
FIG. 4
FIG. 5
FIG. 3

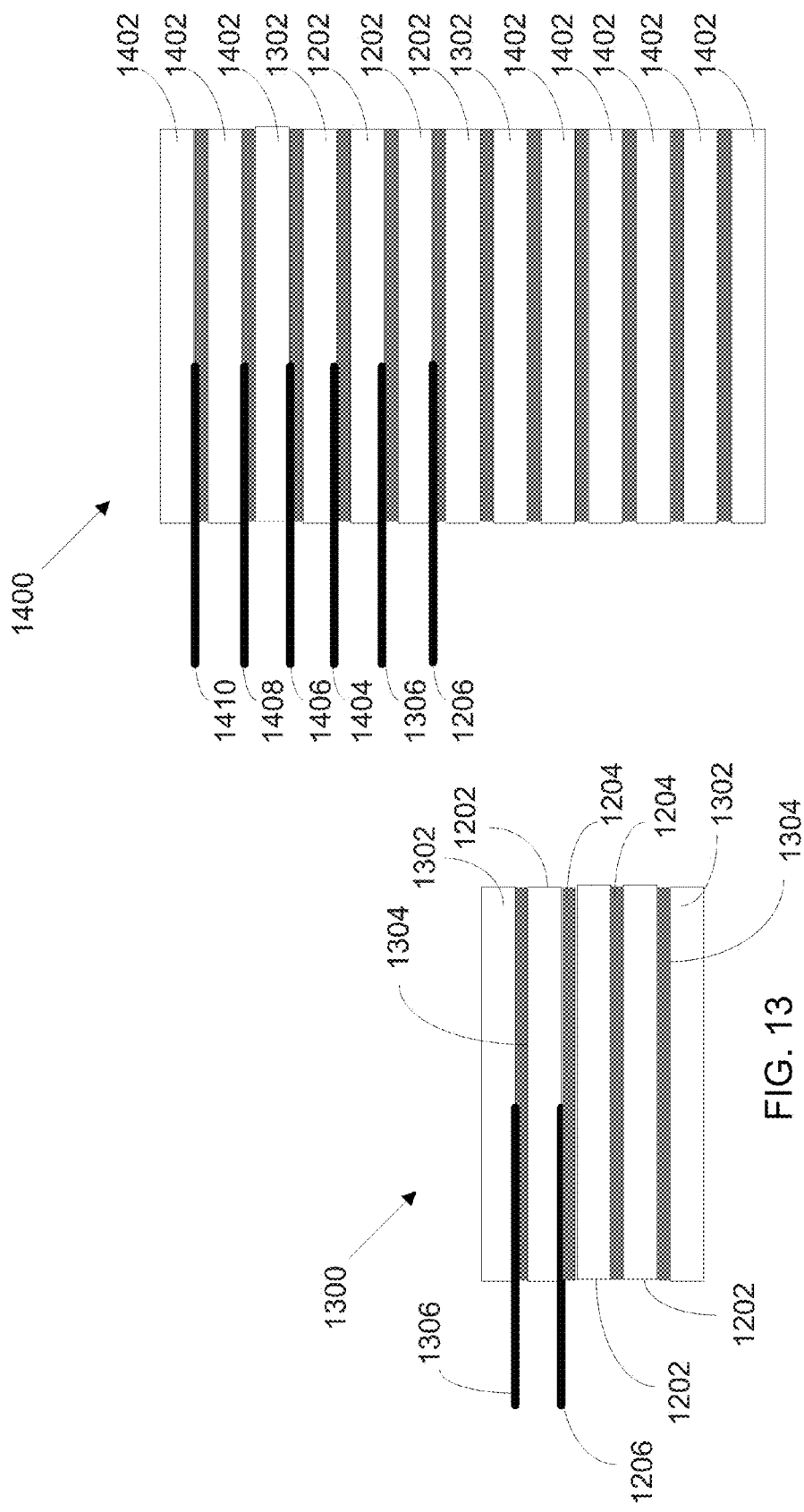

SYSTEM AND METHOD FOR MANUFACTURING COMPOSITE WOOD PRODUCTS

TECHNICAL FIELD

The present disclosure is directed generally towards systems and methods for manufacturing composite wood products in a manner that utilizes residual heat in sequential manufacturing steps.

BACKGROUND

Laminated veneer lumber (LVL) is a wood composite product made by laminating selected veneers in a parallel alignment. In conventional LVL manufacturing processes, round logs are slashed and heated, and then veneer is peeled, clipped, and dried. The veneers are then graded and sorted based on quality. After grading, large billets of LVL are laid up and pressed using a highly automated process. LVL billets are produced by applying layers of veneer and adhesive sequentially to a moving belt. The applied adhesive between each layer of veneer is commonly referred to in the industry as a "glue line." After lay-up, some mills prepress the LVL billets in a cold press prior to final pressing in a hot press.

LVL hot press methods fall into two primary categories: continuous press processing and fixed length press processing. Both press methods are limited by the adhesive cure speed in the innermost or core glue line. Typically, temperatures for curing the core glue line are in a target range of about 225° F. to about 240° F. for complete cure. Heating the core glue line to a lower temperature may lead to delamination and separation of the laminate by lack of adhesion. Heating the core glue line to a higher temperature may result in "heat blows" whereby steam pressure literally separates the bonded layers making the product useless.

The time required to achieve a temperature within the target range is dependent upon a number of material and process variables. Accordingly, many LVL facilities must limit production due to press limitations and speed of production. Some facilities have experimented with increasing the temperature of the platens on presses to accelerate the time required to achieve a temperature within the target range, but this practice may lead to wood degradation, delamination, and heat blows. The use of microwave pre-heaters may improve throughput when billets are pre-heated to a temperature below the target range before hot pressing, but this increased production may also come with higher capital requirements, energy costs, and process complications.

The production limitation challenges discussed above with respect to LVL manufacturing facilities also apply to manufacturing processes for other wood composite products. Thus, there is a need to develop new systems and methods for manufacturing wood composites to overcome capacity limitations. Ideally such systems and methods would enable an increased through-put for production of wood composite products without the drawbacks of other known methods.

SUMMARY

The following summary is provided for the benefit of the reader only and is not intended to limit in any way the invention as set forth by the claims. The present disclosure is directed generally towards systems and methods for manufacturing composite wood products.

In some embodiments, methods according to the disclosure include performing an initial manufacturing step and performing a subsequent manufacturing step before residual heat from the initial manufacturing step completely dissipates. The initial manufacturing step includes combining veneers with an adhesive and heating and consolidating the veneers to form a core laminate. The one or more subsequent manufacturing steps each include applying one or more layers to the core laminate. The one or more layers each include a veneer component and an adhesive component. The core laminate and the one or more layers are sequentially heated and pressed to form a composite wood product.

Further aspects are directed towards systems for manufacturing composite wood products. In some embodiments, the system includes a primary press configured to heat and consolidate a first group of resinated veneers to form a core laminate. One or more application mechanisms are arranged in series after the first press. One or more secondary presses are arranged in series with the application mechanisms, each of the one or more secondary presses configured to sequentially heat and consolidate the core laminate and the one or more layers to form a composite wood product.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIGS. 3-5 are schematic side views of a wood composite during various stages of manufacturing according to methods in the disclosure;

FIGS. 12-14 are schematic side views of a composite wood product made according to systems and methods described in the disclosure.

DETAILED DESCRIPTION

The present disclosure is directed generally towards systems and methods for manufacturing composite wood products in a manner that utilizes residual heat in sequential manufacturing steps. Certain specific details are set forth in the following description and FIGS. 1-15 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "composite wood product" is used to refer to a range of derivative wood products which are manufactured by binding together veneers. Although the disclosure frequently uses the example of laminated veneer lumber (LVL) when discussing composite wood products, the systems and methods described in the disclosure are not limited to LVL production. Examples of other composite wood products in this disclosure include but are not limited to medium density fiberboards (MDF), oriented strand board (OSB), laminated strand lumber (LSL), parallel strand lumber (PSL), oriented strand lumber (OSL), particleboard, and plywood. The term "wood" is used to refer to any cellulosic material. The term "veneers" is used herein to refer to thin pieces of material derived from wood or another material. Examples of veneers in this disclosure include, but are not limited to solid wood, a wood strand composite, fiberglass, carbon fiber, fiberboards, particleboard, a bamboo composite and a grass strand composite.

Figure 1:
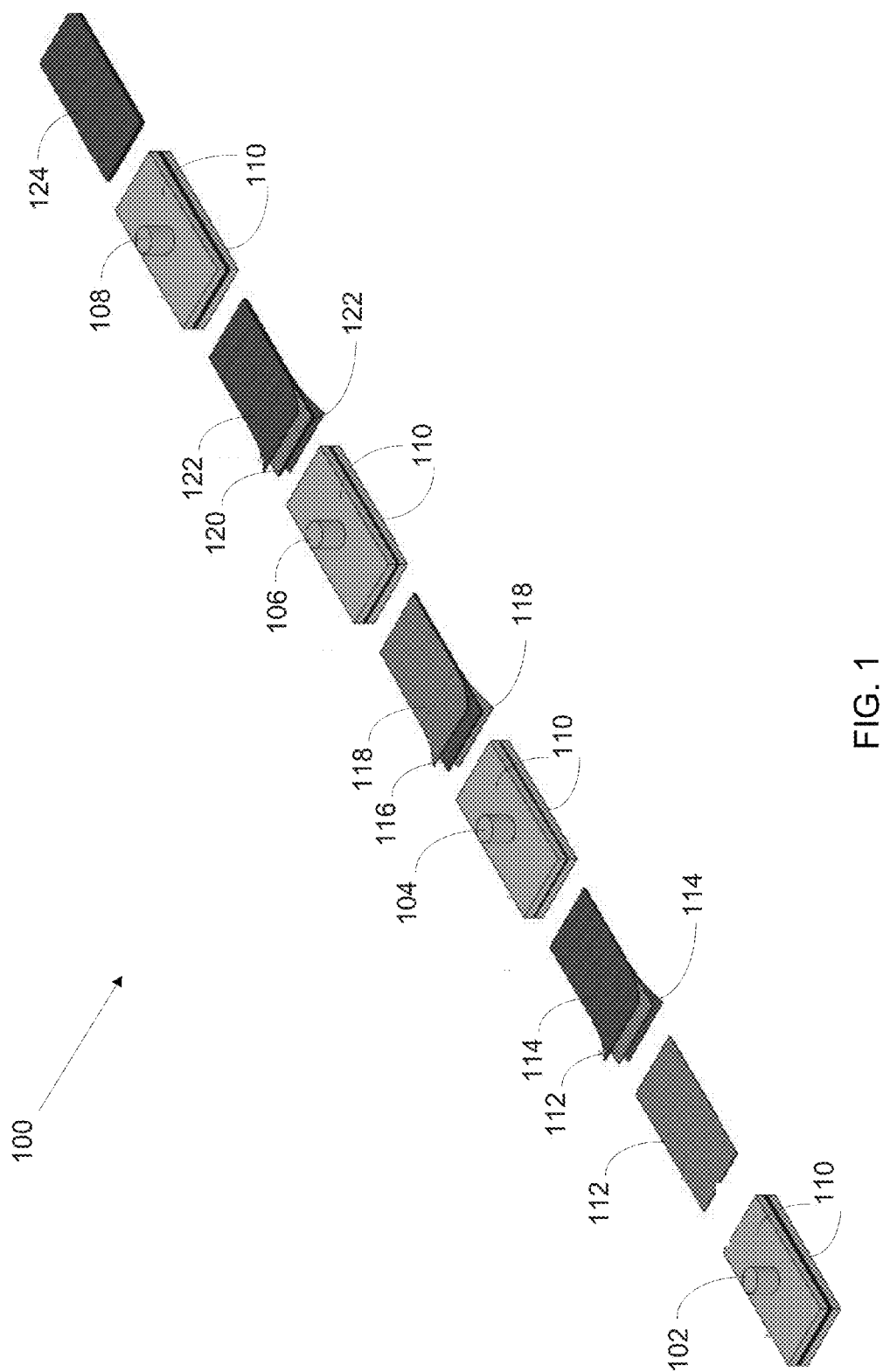
FIG. 1 is a schematic view of a system for manufacturing a wood composite according to embodiments of the disclosure.

FIG. 1 is a schematic view of a system 100 for manufacturing a wood composite product according to embodiments of the disclosure. In the embodiment shown, the system 100 includes a primary press 102 and one or more secondary presses. In the particular embodiment depicted in FIG. 1, the system 100 includes three secondary presses: a first secondary press 104, a second secondary press 106, and third secondary press 108. In other embodiments, the system may include a number of secondary presses other than three. The number of secondary presses may depend on the number of layers the composite wood product being manufactured with the system is intended to possess. The primary press 102 and each of the secondary presses (104, 106, and 108) may include a pair of vertically opposed platens 110. The vertically opposed platens move toward one another to heat and compress material in a manner that is well known to a person of ordinary skill in the art. Additionally, the primary press 102 and the one or more secondary presses (104, 106, and 108) may be any type of press known to a person of ordinary skill in the art.

Figure 2:
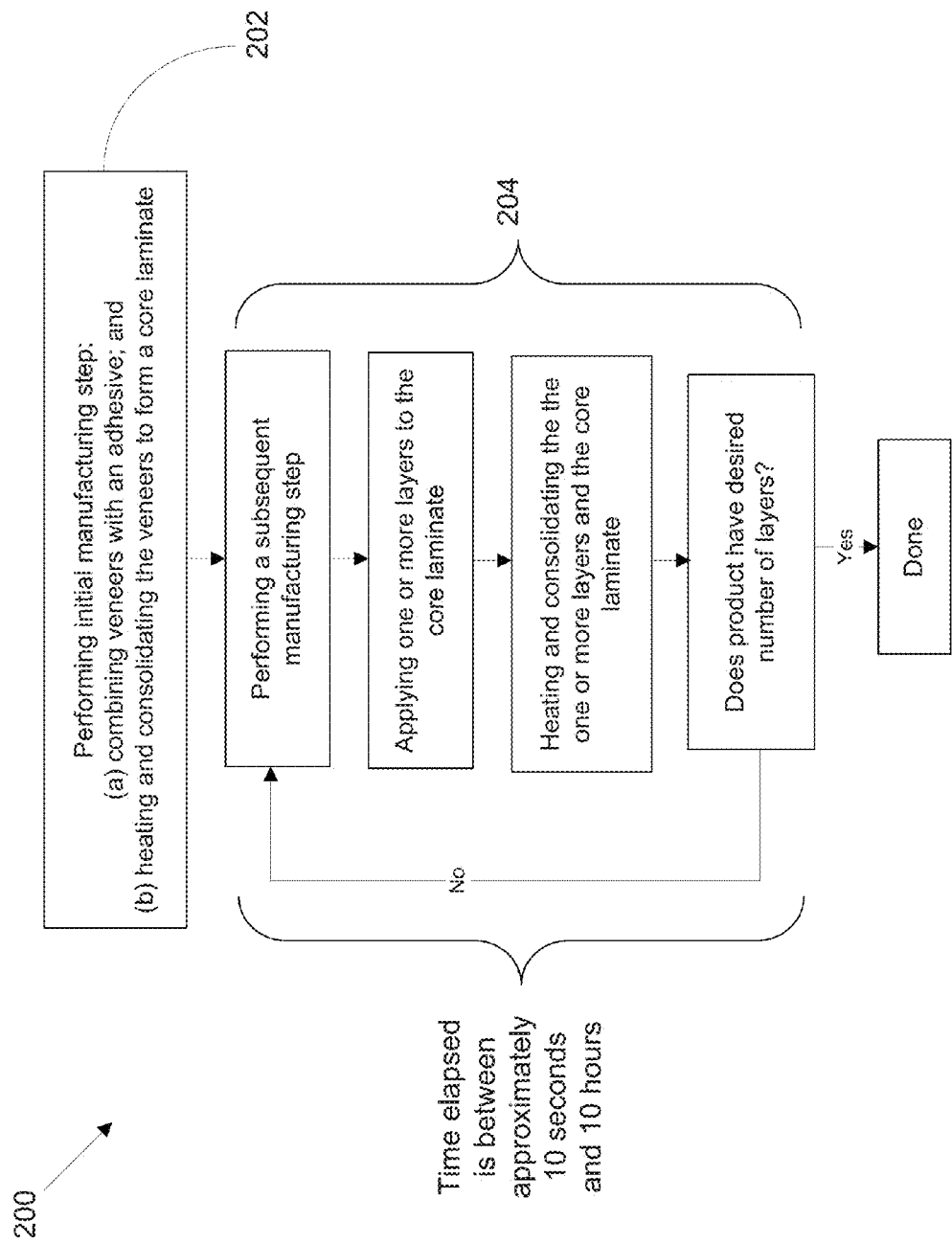
FIG. 2 is a flow chart illustrating the steps for manufacturing a wood composite according to methods in the disclosure.

FIG. 2 is a flowchart 200, which illustrates the steps for manufacturing a wood composite according to methods in the disclosure. According to FIG. 2, the method includes performing an initial manufacturing step 202 and performing one or more subsequent manufacturing steps 204, the subsequent manufacturing steps each being performed before residual heat from the initial manufacturing step 202 completely dissipates. Performing the one or more subsequent steps 204 before complete dissipation of the heat from the initial manufacturing step 202 may increase the efficiency of production when compared to conventional methods through utilization of latent heat. FIGS. 3-5 are side views of a wood composite during various stages of manufacturing according to the disclosure. Methods for manufacturing a wood composite according to the disclosure will now be described in detail with reference to FIGS. 1-5.

Referring back to FIG. 2, the initial manufacturing step 202 may include: (a) combining veneers with an adhesive; and (b) subsequently heating and consolidating the veneers to form a core laminate 112. Combination of the veneers and the adhesive may be accomplished using any type of equipment known to a person of ordinary skill in the art. Application mechanisms suitable for use with systems and methods according to the disclosure include but are not limited to roll coaters, resin curtains, spray booths, extruders, and foaming nozzles. Any type of adhesive known to a person of ordinary skill in the art may be used for formation of the core laminate 112. Resins suitable for use with methods according to the disclosure include, for example, phenyl formaldehyde resins, urea formaldehyde resins, isocyanate-based resins, and urethane-based resins.

In some embodiments, the core laminate 112 may be formed using a core group of veneers, which are specifically selected to form the core of the wood composite product. In conventional wood composite manufacturing processes, it is common practice to scan and grade veneers using structural and/or visual techniques in an effort to best utilize the available raw veneer material. In some embodiments, the raw veneer material available to the manufacturer may be scanned and/or graded according to known techniques to assess veneer properties such as quality, density, stiffness, strength, and species. The core group of veneers may be selected based on the properties of the available raw veneer material. For example, the veneers having the lowest density, strength and/or quality may be selected. In some embodiments, the core group of veneers is selected to have an average modulus of elasticity (MOE) less than approximately 1,600,000 psi (pounds per square inch). Any number of veneers may be selected to form the core group of veneers. In some embodiments, the core laminate 112 is approximately two veneers thick to approximately five veneers thick.

Referring to FIG. 3, a side view of the core laminate 112 is shown. At this stage in the manufacturing process, the core laminate 112 includes a top surface 302 and a bottom surface 304. The core laminate 112 comprises both a veneer component 306 (e.g., the core group of veneers) and an adhesive component. One or more center glue lines 310 are defined in FIG. 3.

Referring to FIG. 1, heating and consolidation of the core group of veneers may be performed by compressing the veneers between the heated platens 110 in the primary press 102. In some embodiments, the veneers are heated until the one or more center glue lines 310 (as shown in FIG. 3) reach a core temperature that is between approximately 150° F. and approximately 280° F. Accordingly the core laminate 112 undergoes a first densification change with respect to the initial density of the core groups of veneers used to make the core laminate 112. In embodiments according to the disclosure, the first densification change may by approximately 2% to approximately 65%.

After the initial manufacturing step 202, one or more subsequent manufacturing steps 204 are performed in accordance with the flow chart 200 shown in FIG. 2. In some embodiments, the one or more subsequent manufacturing steps 204 are all performed within a fixed time after the initial manufacturing step 202 in order to utilize latent heat from the initial manufacturing step 202. The duration of time between the initial manufacturing step 202 and the one or more subsequent manufacturing steps 204 may be as short as about ten seconds or as long as about ten hours. In embodiments according to the disclosure, the one or more subsequent manufacturing steps 204 are performed before the latent heat in the core laminate 112 completely dissipates.

The one or more subsequent manufacturing steps 204 may be effective to build a desired number of veneer layers around the core laminate 112, thereby forming a wood composite product. Referring to FIGS. 1, 2, and 4, each of the subsequent manufacturing steps 204 may include applying one or more layers to the core laminate 112. The one or more layers may each include a veneer component 402, an adhesive component, and one or more glue lines (shown in the Figure as one or more first glue lines 404). Thus, each layer may be referred to as a first layer of resinated veneers 114. Any type of adhesive known to a person of ordinary skill in the art may be used for formation of the first layer of resinated veneers 114. Resins suitable for use with methods according to the disclosure include, for example, phenyl formaldehyde resins, urea formaldehyde resins, isocyanate-based resins and urethane-based resins.

In some embodiments, the veneers to be used in each first layer of resinated veneers 114 are selected to have an average modulus of elasticity (MOE) between approximately 500,000 psi and approximately 3,500,000 psi. In some embodiments, the resinated veneers 114 are selected to have an average modulus of elasticity (MOE) between approximately 1,300,000 psi and approximately 3,500,000 psi. Any number of veneers may be selected to form each first layer of resinated veneers 114. In some embodiments, each first layer of resinated veneers 114 is approximately two veneers thick to approximately five veneers thick.

Referring to FIGS. 1, 3, and 4, the one or more first layers of resinated veneers 114 may be applied to either the top surface 302 of the core laminate 112 or the bottom surface 304 of the core laminate 112. Alternatively, the one or more first layers of resinated veneers 114 may be applied to both the top surface 302 and the bottom surface 304 of the core laminate 112. In some embodiments, the application mechanism used to apply the one or more first layers of resinated veneers 114 comprises a top component for applying the first layer of resinated veneers 114 to the top surface 302 and a bottom component for applying the first layer of resinated veneers 114 to the bottom surface 304. Application mechanisms suitable for use with systems and methods according to the disclosure include but are not limited to roll coaters, resin curtains, spray booths, extruders, and foaming nozzles.

Referring back to FIGS. 1 and 2, each of the one or more subsequent manufacturing steps 204 may also include sequentially heating and consolidating the core laminate 112 and the one or more first layers of resinated veneers 114 to form a first billet 116. As stated above, heating and consolidation may be performed shortly after formation of the core laminate to utilize the latent heat from that manufacturing process. As shown in FIG. 1, heating and consolidation of the one or more first layers of resinated veneers 114 may be performed by compressing the one or more first layers of resinated veneers 114 and the core laminate 112 between the heated platens 110 in the first secondary press 104. In some embodiments, the temperature to which the one or more first glue lines 404 (shown in FIG. 4) are heated is a stepwise increase from the temperature to which the one or more center glue lines 310 (shown in FIG. 3) was heated during the initial manufacturing step 202. Accordingly, the one or more first layers of resinated veneers 114 undergo a second densification change with respect to the initial density of the veneers used to make the one or more first layer of resinated veneers. In embodiments according to the disclosure, the second densification is substantially smaller than the first densification change undergone by the core group of veneers during densification of the core laminate 112.

After the one or more first layers of resinated veneers 114 are applied, heated, and consolidated, additional layers may be added to achieve the desired number of layers for the final composite wood product. If the manufacturer is aiming to produce a composite wood product having two or three layers, the first billet 116 may undergo further processing so it can be sold as a composite wood product. If the manufacturer desires to produce a product having more layers, additional steps may be performed.

In FIG. 1, one or more second layers of resinated veneers 118 is shown being applied to the first billet 116. The one or more second layers of resinated veneers 118 may be applied to the top surface of the first billet 116, the bottom surface of the first billet 116, or both the top surface and the bottom surface of the first billet 116. The one or more second layers of resinated veneers 118 may be heated and consolidated by the second secondary press 106. In some embodiments, the temperature to which the one or more second resinated veneers 118 and the first billet 116 are heated is a stepwise increase higher than the temperature used by the first secondary press 104 to heat the one or more first layers of resinated veneers 114 and the core laminate 112. Such heating and consolidation creates a second billet 120.

If further layers are desired, one or more third layers of resinated veneers 122 may be applied to the second billet 120. The one or more third layers of resinated veneers 122 may be applied to the top surface of the second billet 120, the bottom surface of the second billet 120, or both the top surface and the bottom surface of the second billet 120. The one or more third layers of resinated veneers 122 may be heated and consolidated by the third secondary press 108. In some embodiments, the temperature to which the one or more third resinated veneers 122 and the second billet 120 are heated is a stepwise increase higher than the temperature used by the second secondary press 108 to heat the one or more first layers of resinated veneers 114 and the first billet 116. Such heating and consolidation creates a third billet 124.

A side view of the third billet 124 is shown schematically in FIG. 5. The one or more second layers of resinated veneers are represented by reference character 502. The one or more third layers of resinated veneers are represented by reference character 504. Although a seven layer (or seven-ply) billet is shown in FIG. 5, composite wood products produced according to methods in the disclosure may include any number of layers that may be suitable for the specific application.

In some embodiments, methods according to the disclosure may be modified to manipulate a vertical density profile for the finished wood composite product. The ability to control the vertical density profile of wood composites is potentially useful because different density profiles may be useful for different applications (e.g., flat bending applications, edge bending applications). Conventional methods for manufacturing wood composite products may result in higher densification of the composite surfaces compared to the core. This is because the wood on the outside of the product reaches a higher temperature sooner and is thus plasticized and easier to compress. By the time the core reaches a temperature sufficient to be plasticized the billet has reached its final thickness. The resulting vertical density profile is U-shaped. For flat bending this is a desirable vertical density profile. An example of using a wood composite product in flat bending is the flange material in the TJI product line that is commercially available from Weyerhaeuser. However, this vertical density profile is not required for beams, columns, unbalances flanges, headers, or other applications.

Methods according to the disclosure may allow the core of the composite wood product to remain in the plasticization temperature range for longer periods of time while under compression. In addition, the compressive forces can be selected for each layer based on the desired vertical density profile. If constant platen temperature and compressive force is applied to a billet with a single type of veneer (density, species, etc.) using methods according to the disclosure, the composite wood product produced should have a relatively uniform vertical density profile when compared to traditional methods. Alternatively the veneer selection and pressing procedures can be modified to obtain a different vertical density profile.

If the methods according to the disclosure are combined with the use of low-grade center material and additional compressive forces for the core laminate, including all low-grade veneer layers, some strength and stiffness properties may improve as the density is elevated. This densification may allow use of material that would not meet the current quality standards with the conventional press method. This may result in a U-shaped vertical density profile, a flat vertical density profile, or an inverted-U vertical density profile depending on the initial veneer density and the degree of compression desired.

If an unbalanced composite wood product is required, the veneers added to each side of the core laminate may change throughout the lay-up. For example, the top surface in a wood composite product intended for use as a flange in an I-joist could have high-grade veneer and the bottom could have low-grade veneer. The pressure will compress the lower density veneer, likely the lower grade, more and increase properties more. If this selective densification is completed for multiple layers, the low grade veneer on the bottom, with higher densification, may be able to hold the composite straight out of the press.

The following examples will serve to illustrate aspects of the present disclosure. The examples are intended only as a means of illustration and should not be construed to limit the scope of the disclosure in any way. Those skilled in the art will recognize many variations that may be made without departing from the spirit of the disclosure.

Example 1

Press Cycle Time for Wood Composite Products Manufactured According Methods in the Disclosure In a first example, wood composite products were manufactured according to systems and methods described in the disclosure and internal bond strength was evaluated. Two billets (a control billet 600 and a test billet 700) were produced using $\frac{1}{7}^{th}$ inch Douglas fir veneers from the Eugene, Oreg. area. Schematics of the control billet 600 and test billet 900 are shown in FIGS. 6-9. The veneers were cut into 24 inch by 12 inch sections and moisture was added to bring the moisture content to about 8-10%. Phenyl formaldehyde resin was then added to the veneers using a Black Brothers roll coater at a spread rate of approximately 30 pounds per square foot. After roll coating, the resinated veneer was further cut into 12 inch by 12 inch sections.

Figure 6:
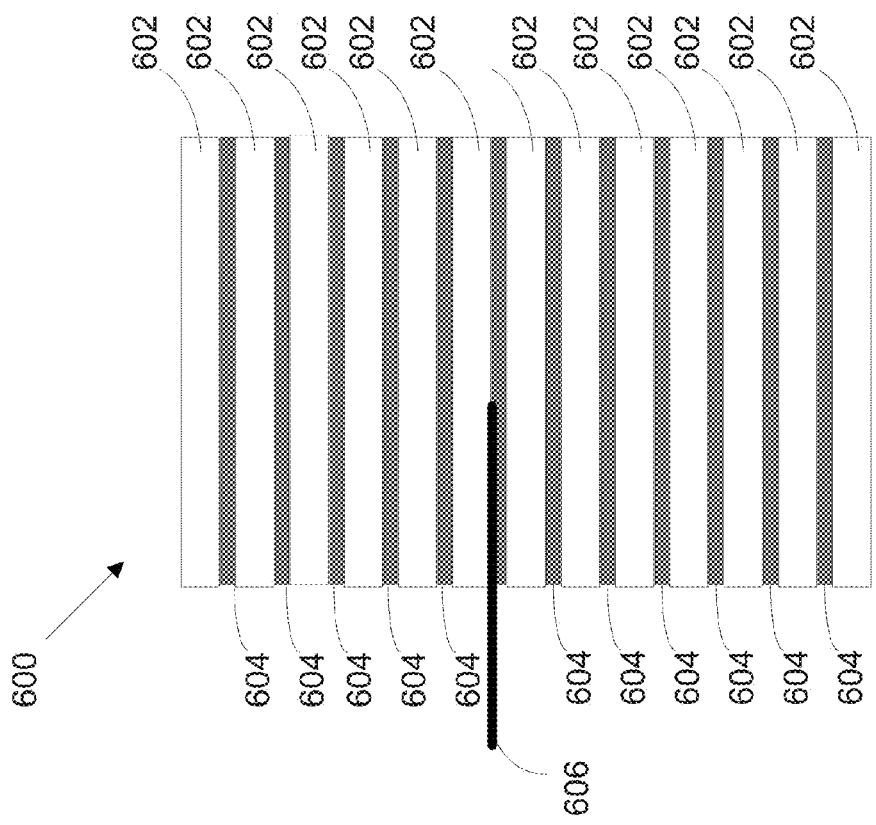
FIG. 6 is a schematic side view of a composite wood product made according to conventional methods.

As shown in FIG. 6, the control billet 600 was manufactured using conventional techniques. Thirteen plies (or layers) of veneers 602 were assembled according to conventional lay-up methods and layered with adhesive components 604. A thermocouple 606 was placed in the upper center glue line and the control billet 600 was placed in a conventional hot platen press and compressed. Once the temperature on the thermocouple 606 reached 250° F., the control billet 600 was removed.

Figure 7:
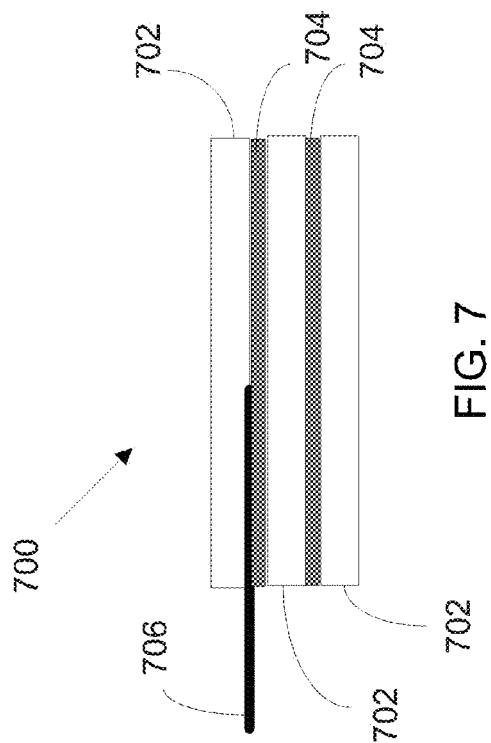
FIGS. 7-9 are schematic side views of a composite wood product made according to systems and methods described in the disclosure.
Figure 9:
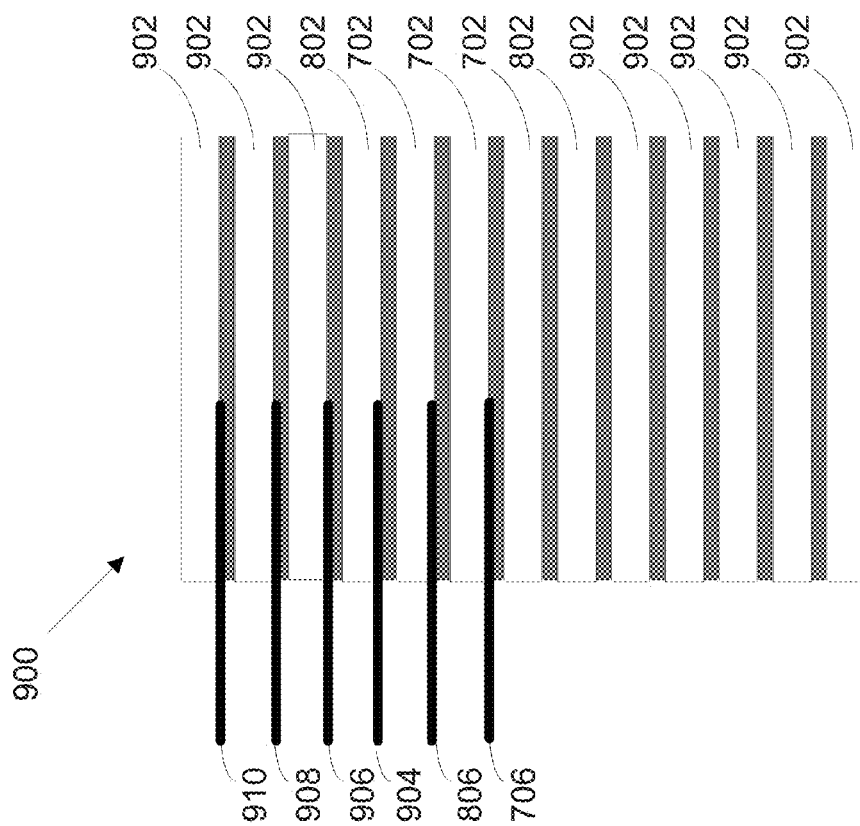
Figure 8:
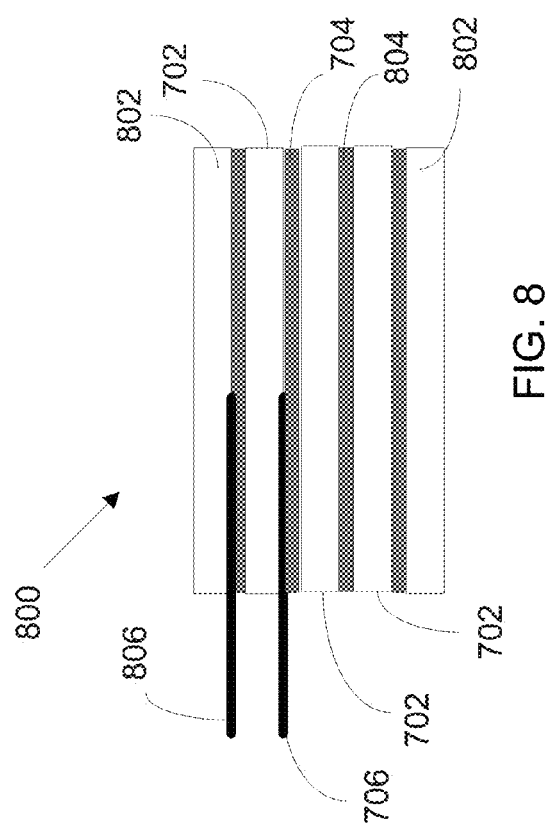

As shown in FIGS. 7-9, the test billet 900 was manufactured using systems and methods according to the disclosure. First, a three-ply billet 700 was created as shown in FIG. 7. Veneer components 702 and adhesive components 704 were pressed until a first glue line reached a temperature of about 255° F. as measured by a first thermocouple 706.

While the three-ply billet 700 was curing, the roll coater was used to apply resin to a 12 inch by 24 inch sheet of veneer. The resinated veneer was then cut into 12 inch by 12 inch sections. Resinated veneers 802 (coated with resin 804) were applied to the top and bottom surfaces of the three-ply billet 700 as shown in FIG. 8, thereby creating a five-ply billet 800. The five-ply billet 800 was pressed until a second glue line reached a temperature of about 255° F. as measured by a second thermocouple 806.

While the five-ply billet 800 was curing, the roll coater was used to apply resin to a 12 inch by 24 inch sheet of veneer. The resinated veneer was then cut into 12 inch by 12 inch sections. Resinated veneers 902 were applied to the top and bottom surfaces of the five-ply billet 800 as shown in FIG. 8, layer-by-layer with a pressing step after each top and bottom layer was added thereby creating a seven-ply billet (not shown). The layering and pressing process described above was repeated until a final thirteen-ply test billet 900 was created. Third, fourth, fifth, and six thermocouples (904, 906, 908, and 910 respectively) were inserted at the appropriate.

Figure 10:
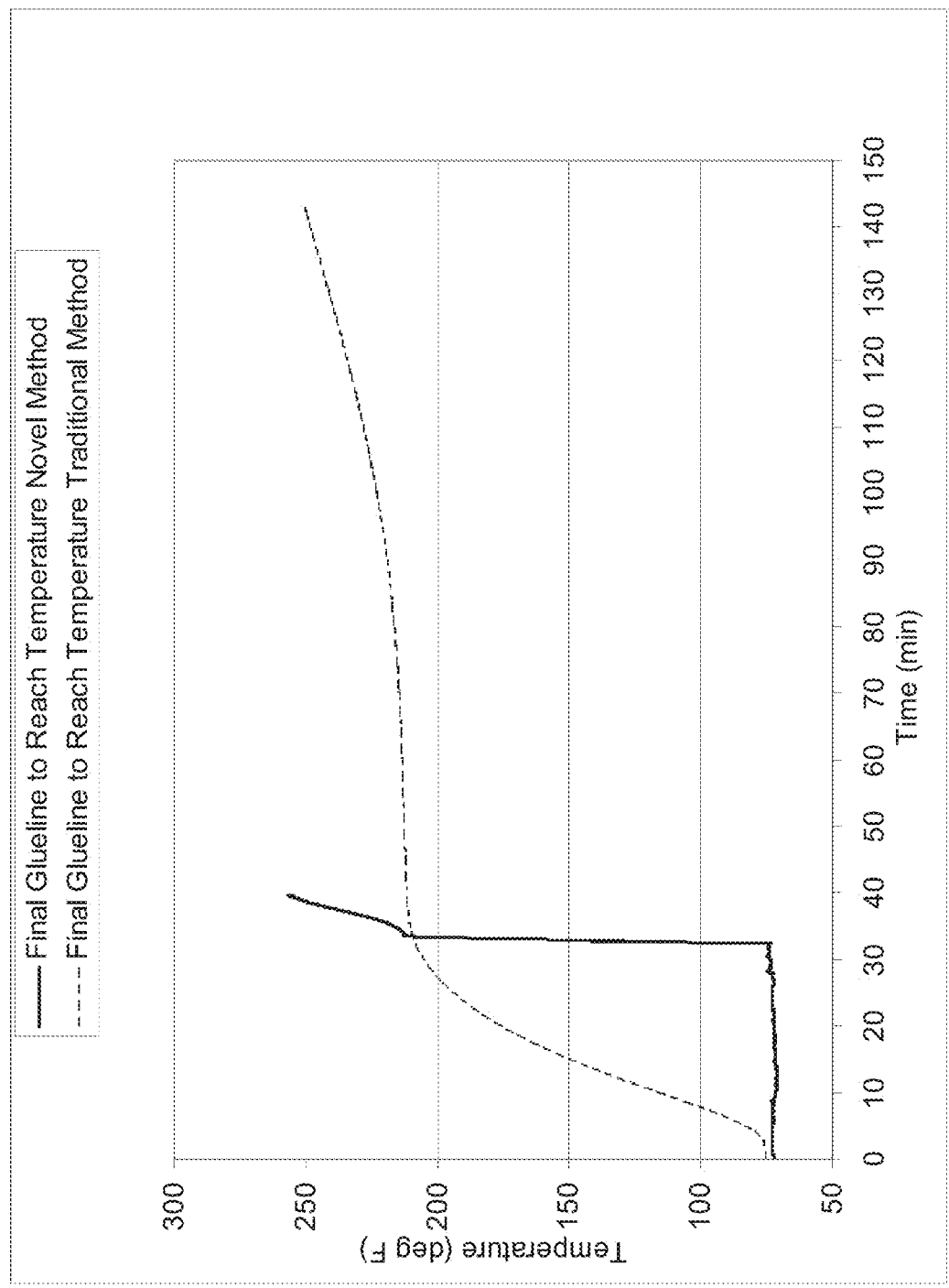
FIG. 10 is a heating curve (temperature vs. time) for producing a control billet using conventional methods and a test billet using methods according to the disclosure.

FIG. 10 shows heating curves (temperature vs. time) for the methods used to produce the control billet 700 and the test billet 900. The total length of the press cycle for the control billet 700 was 143 minutes. The total length of the press cycle for the test billet 900 was 40 minutes. Thus, systems and methods according to the disclosure enabled a substantial reduction in overall press cycle time when compared to conventional methods.

Example 2

Density Profiles of Wood Composite Products Manufactured According Methods in the Disclosure In a second example, wood composite products were manufactured according to systems and methods described in the disclosure and the resulting density profiles were evaluated. Two billets (a control billet 1100 and a test billet 1400) were produced using $\frac{1}{7}^{th}$ inch Douglas fir veneers from the Eugene, Oreg. area. The veneers were cut into 12 inch by 12 inch pieces before formation of the wood composites. The veneers had an initial moisture content of 5.2%. Before pressing, the initial thickness of each piece of veneer was measured one inch in on the mid-point of each side.

Figure 11:
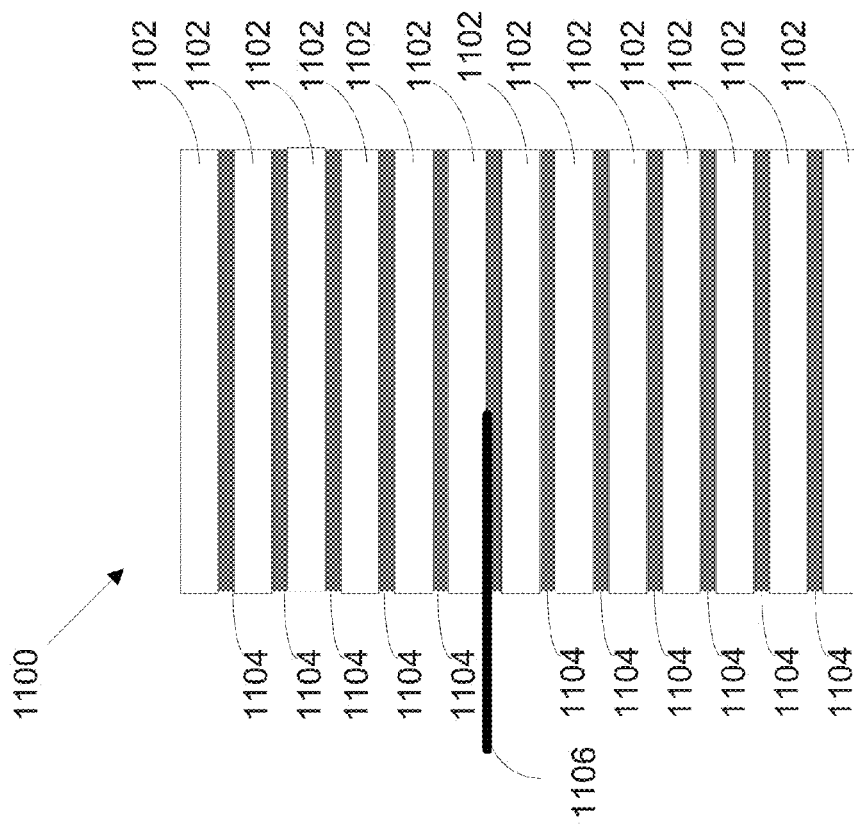
FIG. 11 is a schematic side view of a composite wood product made according to conventional methods.

As shown in FIG. 11, the control billet 1100 was manufactured using conventional techniques. Thirteen plies (or layers) of veneers 1102 were assembled according to conventional lay-up methods. In place of an adhesive, approximately 4% water 1104 was sprayed onto one side of each of the veneers 1102. Water was used in place of resin to allow the veneers 1102 to be more easily separated so that a density profile could be measured. A thermocouple 1106 was placed in the location where the upper center glue line would be and the control billet 1100 was placed in a conventional hot platen press and compressed. The press platens were heated to 385° F. and the control billet 1100 was pressed until the thermocouple 1106 reached 250° F. The total press cycle time for producing a control billet using conventional methods was approximately 68 minutes.

Figure 12:
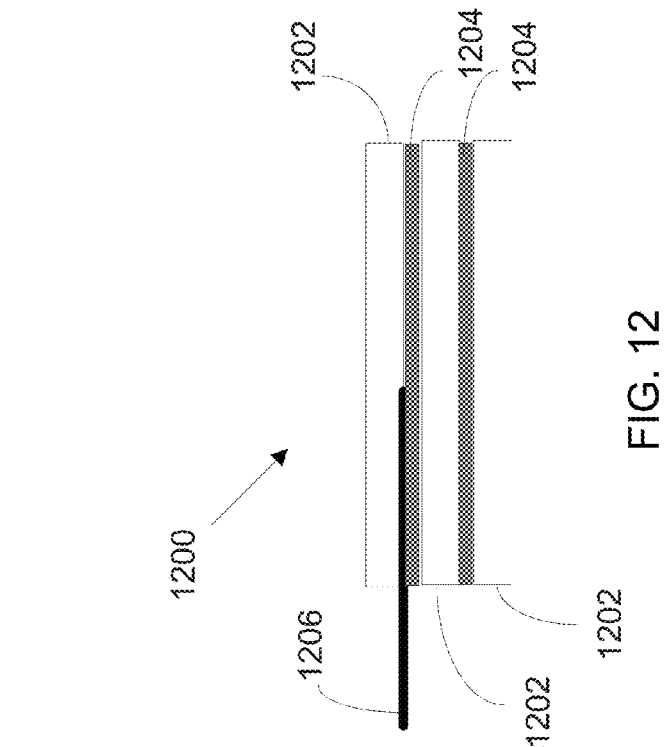

As shown in FIGS. 12-14, the test billet 1400 was manufactured using systems and methods according to the disclosure. The total press cycle time for producing a test billet according to embodiments in the disclosure was approximately 18 minutes. First, a three-ply billet 1200 was created as shown in FIG. 12. Veneer components 1202 were sprayed with water 1204. A thermocouple 1206 was inserted and the three-ply billet 1200 was pressed until the thermocouple 1206 reached 250° F. Wetted veneers 1302 were applied to the top and bottom surfaces of the five-ply billet 1300 as shown in FIG. 13, thereby creating a seven-ply billet (not shown). The layering and pressing process described above was repeated until a final thirteen-ply test billet 1400 was created. Third, fourth, fifth, and six thermocouples (1404, 1406, 1408, and 1410 respectively) were inserted at the appropriate layers and each press cycle temperature was increased in a step wise fashion.

Figure 15:
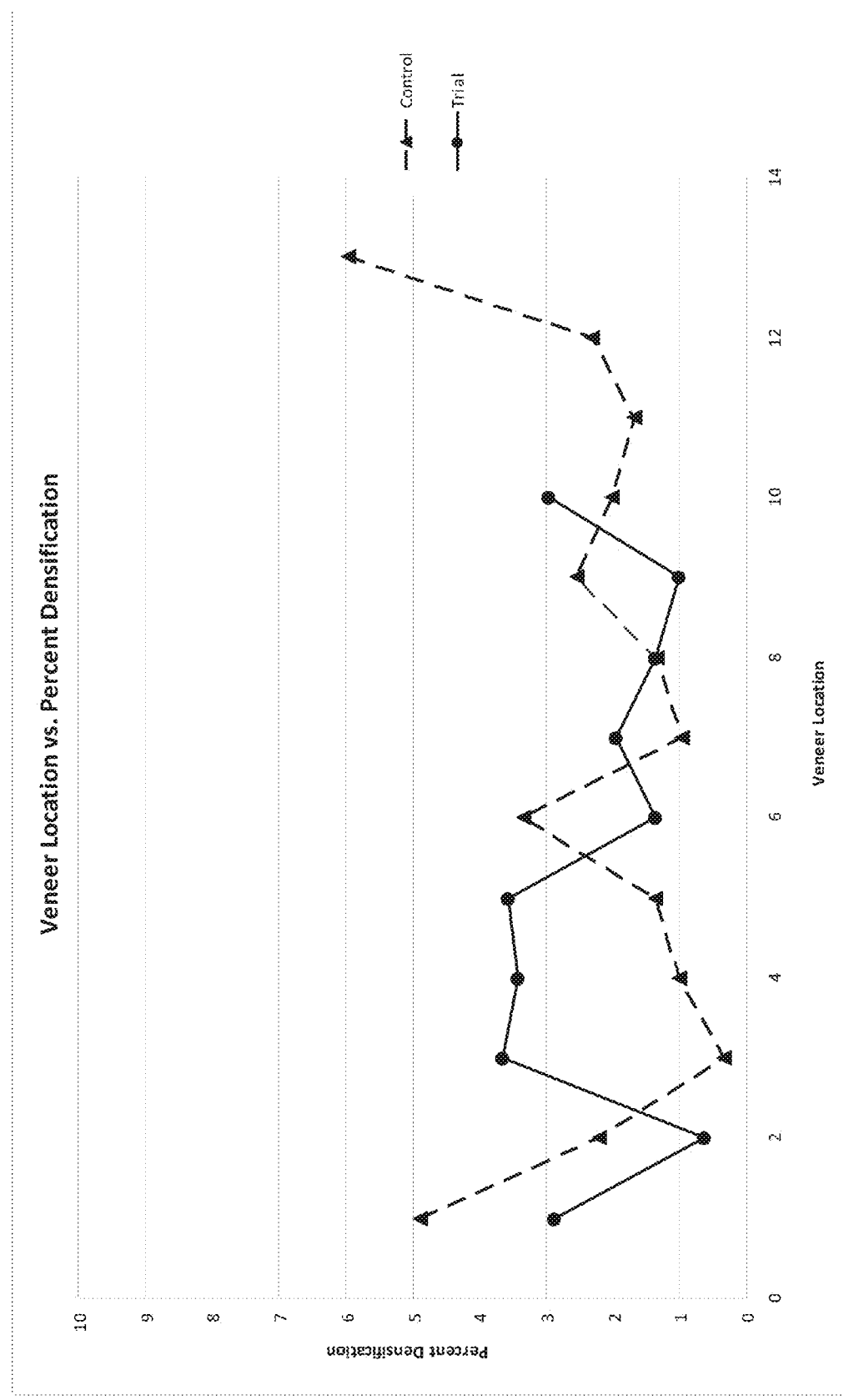
FIG. 15 is a vertical density profile plot (veneer location vs. percent densification) of a control billet using conventional methods and a test billet using methods according to the disclosure.

Immediately after pressing the thickness of each veneer in the control billet 1100 and the test billet 1400 was measured. Each veneer was measured one inch in at the mid-point of each side. The percent compression of each veneer was then calculated using based on the initial thickness measurements and the post-press thickness measurements. FIG. 15 is a vertical density profile plot (veneer location vs. percent densification) of a control billet using conventional methods and a test billet using methods according to the disclosure. In general, the compression measured in methods according to the disclosure is less than is typically seen at manufacturing facilities. However, the trend illustrated would likely be emphasized with further compression rather than reversed. The traditional pressing produced the expected U-shaped vertical density profile. Methods according to the disclosure created a flatter profile, which may be useful for some applications. Accordingly, vertical density profiles of wood composite products created using systems and methods according to the disclosure may be adjusted for particular applications.

From the foregoing, it will be appreciated that the specific embodiments of the disclosure have been described herein for purposes of illustration, but that various modifications may be made without deviating from the disclosure. For example, modifications to the pressing cycle and temperature ranges disclosed that would be obvious to a person of ordinary skill in the art are envisioned as part of the disclosure. Additionally, the disclosure foresees a person of ordinary skill in the art using methods disclosed to produce wood composite products that are not explicitly disclosed.

Aspects of the disclosure described in the context of particular embodiments may be combined or eliminated in other embodiments. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

We claim:

1. A method for manufacturing a composite wood product comprising the steps of:
    performing an initial manufacturing step, the initial manufacturing step comprising the steps of:
        combining veneers with an adhesive; and
        heating and compressing the veneers within a press until the adhesive reaches a first predetermined temperature and the veneers undergo a first densification change, thereby forming a core laminate;
    performing one or more subsequent manufacturing steps, the one or more subsequent manufacturing steps each comprising the steps of:
        applying one or more layers to the core laminate, the one or more layers each comprising:
            a veneer component; and
            an adhesive component; and
        sequentially heating and compressing the core laminate and the one or more layers within a press until the adhesive component reaches a second predetermined temperature higher than the first predetermined temperature and the veneer component of each of the one or more layers undergoes a second densification change, thereby forming a composite wood product;
    wherein the one or more subsequent manufacturing steps are performed before residual heat from the initial manufacturing step completely dissipates.

2. The method of claim 1:
    wherein the step of heating and compressing the veneers to form a composite laminate comprises compressing the veneers with a primary press, the primary press having a pair of vertically opposed primary heated platens; and
    wherein the step of sequentially heating and compressing the core laminate and the one or more layers to form a composite wood product comprises compressing the core laminate and the one or more layers with one or more secondary presses, each of the one or more secondary presses having a pair of vertically opposed secondary heated platens.

3. The method of claim 2 wherein the step of compressing the veneers with the primary press comprises moving the pair of vertically opposed primary heated platens toward one another until the veneers undergo a first densification change between approximately 2% to approximately 65%.

4. The method of claim 2 wherein the step of compressing the core laminate and the one or more layers with one or more secondary presses comprises moving the pair of vertically opposed secondary heated platens toward one another until the core laminate and the one or more layers undergo the second densification change, the first densification change being substantially larger than the second densification change.

5. The method of claim 1 wherein the composite wood product is selected from the group consisting of: laminated veneer lumber (LVL), medium density fiberboards (MDF), oriented strand board (OSB), laminated strand lumber (LSL), parallel strand lumber (PSL), oriented strand lumber (OSL), particleboard, and plywood.

6. The method of claim 1 wherein the composite wood product has a thickness and the wood composite product has a designated vertical density profile across the thickness, the designated vertical density profile being based on application of the composite wood product.

7. The method of claim 1 wherein the core laminate has a top surface and a bottom surface and the step of applying the one or more layers to the core laminate comprises:
    applying the one or more layers to the top surface of the core laminate; and/or
    applying the one or more layers to the bottom surface of the core laminate.

8. The method of claim 1 wherein the core laminate is approximately two veneers thick to approximately five veneers thick.

9. The method of claim 1 wherein the veneer component in each of the one or more layers is approximately one veneers thick to approximately four veneers thick.

10. A method for manufacturing a composite wood product comprising the steps of:
    (a) forming a core laminate by:
        (i) selecting a core group of veneers;
        (ii) combining the core group of veneers with an adhesive, thereby creating one or more center glue lines;
        (iii) heating and compressing the core group of veneers within a press until the one or more center glue lines reaches a first predetermined temperature and the core group of veneers undergo a first densification change, thereby forming a core laminate, the core laminate having a top surface and a bottom surface;
    (b) applying one or more first layers of resinated veneers to the top and/or bottom surface of the core laminate, thereby creating one or more first glue lines;

(c) heating and compressing the core laminate and the one or more first layers within a press until the one or more first glue lines reaches a second predetermined temperature higher than the first predetermined temperature and the one or more first layers of resinated veneers undergo a second densification change, thereby forming a first billet, the first billet having a top surface and a bottom surface;

(d) applying one or more second layers of resinated veneers to the top and/or bottom surface of the first billet, thereby creating one or more second glue lines; and (e) heating and compressing the first billet and the one or more second layers of veneers within a press until the one or more second glue lines reaches a third predetermined temperature higher than the second predetermined temperature and the one or more second layers of resinated veneers undergo a third densification change, thereby forming a third billet, the third billet having a top surface and a bottom surface;

wherein step (c) and step (e) utilize residual heat from step (a)(iii).

11. The method of claim 10:
wherein step (c) is performed within about ten seconds to about ten hours after completion of step (a)(iii); and
wherein step (e) is performed within about ten seconds to about ten hours after completion of step (c).

12. The method of claim 10, further comprising the steps of:
(f) applying one or more third layers of resinated veneers to the top and/or bottom surface of the third billet, thereby creating one or more third glue lines;
(g) heating and compressing the third billet and the one or more third layers of veneers within a press until the one or more third glue lines reaches a fourth predetermined temperature higher than the third predetermined temperature and the one or more third layers of resinated veneers undergo a fourth densification change, thereby forming a fourth billet, the fourth billet having a top surface and a bottom surface;
(h) applying one or more fourth layers of resinated veneers to the top and/or bottom surface of the fourth billet, thereby creating one or more fourth glue lines;
(i) heating and compressing the fourth billet and the one or more fourth layers of veneers within a press until the one or more fourth glue lines reaches a fifth predetermined temperature higher than the fourth predetermined temperature and the one or more fourth layers of resinated veneers undergo a fifth densification change, thereby forming a fifth billet, the fifth billet having a top surface and a bottom surface;
(j) applying one or more fifth layers of resinated veneers to the top and/or bottom surface of the fifth billet, thereby creating one or more fifth glue lines;
(k) heating and compressing the fifth billet and the one or more fifth layers of veneers within a press until the one or more fifth glue lines reaches a sixth predetermined temperature higher than the fifth predetermined temperature and the one or more fifth layers of resinated veneers undergo a sixth densification change, thereby forming a sixth billet, the sixth billet having a top surface and a bottom surface;
(l) applying one or more sixth layers of resinated veneers to the top and/or bottom surface of the sixth billet, thereby creating one or more sixth glue lines;
(m) heating and compressing the sixth billet and the one or more sixth layers of veneers within a press until the one or more sixth glue lines reaches a seventh predetermined temperature higher than the sixth predetermined temperature and the one or more sixth layers of resinated veneers undergo a seventh densification change, thereby forming a composite wood product.

13. The method of claim 12, further comprising completing steps (a) through steps (m) in under approximately forty minutes.

14. The method of claim 12:
wherein step (a)(iii) comprises:
compressing the core group of veneers with a primary press; and
heating the core group of veneers until the one or more center glue lines reach a core temperature between approximately 180° F. and approximately 230° F.; and
wherein the first temperature, the second temperature, the third temperature, the fourth temperature, the fifth temperature, and the sixth temperature do not exceed approximately 300° F.

15. The method of claim 10 wherein the step of selecting a core group of veneers is based at least partially on veneers quality and strength.

16. The method of claim 10 wherein the core group of veneers, the first layer of resinated veneers, the second layer of resinated veneers, the third layer of resinated veneers, the fourth layer of resinated veneers, the fifth layer of resinated veneers, and the sixth layer of resinated veneers are selected from the group consisting of: veneers, solid wood, a wood strand composite, fiberglass, carbon fiber, fiberboards, particleboard, and a grass strand or particle composite.

17. The method of claim 10 wherein the core group of veneers have an average modulus of elasticity less than approximately 1,600,00 psi and the resinated veneers have an average modulus of elasticity between approximately 1,300,000 psi and approximately 3,500,000 psi.

18. The method of claim 1, wherein the first densification change is substantially larger than the second densification change.

19. The method of claim 10, wherein the first densification change is substantially larger than the second and third densification changes.

20. A method for manufacturing a composite wood product comprising the steps of:
performing an initial manufacturing step, the initial manufacturing step comprising the steps of:
combining veneers with an adhesive; and
heating and compressing the veneers within a press at a first predetermined temperature for a first predetermined amount of time such that the veneers undergo a first densification change, thereby forming a core laminate;
performing one or more subsequent manufacturing steps, the one or more subsequent manufacturing steps each comprising the steps of:
applying one or more layers to the core laminate, the one or more layers each comprising:
a veneer component; and
an adhesive component; and
sequentially heating and compressing the core laminate and the one or more layers within a press at the first predetermined temperature for a second predetermined amount of time such that the veneer component of each of the one or more layers undergoes a second densification change, thereby forming a composite wood product;

wherein the one or more subsequent manufacturing steps are performed before residual heat from the initial manufacturing step completely dissipates.

* * * * *